United States Patent
Adams

(10) Patent No.: US 6,880,596 B2
(45) Date of Patent: Apr. 19, 2005

(54) TIRE ASSEMBLY INCLUDING TIRE SUPPORT RING

(75) Inventor: Anthony Dennis Adams, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 266 days.

(21) Appl. No.: 10/133,666

(22) Filed: Apr. 26, 2002

(65) Prior Publication Data

US 2003/0201045 A1 Oct. 30, 2003

(51) Int. Cl.$^7$ .......................... B60C 17/04; B60C 17/06
(52) U.S. Cl. ................................ 152/158; 152/520
(58) Field of Search .......................... 152/152, 158, 152/520, 5, 7, 326; 425/37

(56) References Cited

U.S. PATENT DOCUMENTS

| | | | | |
|---|---|---|---|---|
| 975,325 | A | * 11/1910 | Budesheim et al. | 152/152 |
| 1,762,905 | A | * 6/1930 | Whitlark | 152/166 |
| 2,620,844 | A | * 12/1952 | Lord | 152/326 |
| 3,485,283 | A | * 12/1969 | Pomeroy et al. | 152/158 |
| 3,635,273 | A | * 1/1972 | Patecell | 152/158 |
| 4,346,747 | A | 8/1982 | Osada et al. | 152/158 |
| 5,749,982 | A | 5/1998 | Muhlhoff et al. | 152/158 |
| 5,891,279 | A | * 4/1999 | Lacour | 152/520 |
| 6,516,849 | B1 | * 2/2003 | Flament et al. | 152/400 |

FOREIGN PATENT DOCUMENTS

| | | | |
|---|---|---|---|
| DE | 637158 | 10/1936 | |
| DE | 2151250 | 4/1973 | |
| DE | 2406422 | 8/1975 | |
| DE | 3405970 | 12/1984 | |
| EP | 0721854 | 7/1996 | |
| EP | 802865 | * 12/2001 | |
| GB | 1556721 | 11/1979 | ........... B60C/17/04 |
| GB | 2183565 | * 6/1987 | |
| WO | WO 96/05917 | * 2/1996 | |
| WO | WO 01/23195 | * 4/2001 | |
| WO | WO 02/22380 | * 3/2002 | |

OTHER PUBLICATIONS

Hofmann, Rubber Technology Handbook, pp. 147–148, 1994.*

* cited by examiner

*Primary Examiner*—Steven D. Maki
(74) *Attorney, Agent, or Firm*—Nancy T. Krawczyk

(57) ABSTRACT

A support ring for vehicle tires is disclosed. The support ring is to be mounted on a tire wheel for support of the underside of the tire when the tire is operated at underinflated conditions. The support ring has a base, a cap, and a series of supporting arches extending between the base and the cap. The highest point of the arch contacts the support ring cap. During load, the arch flexes and transmits the load force along the arch sides and to the base of the support ring.

10 Claims, 2 Drawing Sheets

TIRE ASSEMBLY INCLUDING TIRE SUPPORT RING

FIELD OF THE INVENTION

The present invention relates to support rings for vehicle tires, which are mounted inside the tires on their wheel rims in order to take up the vehicle load in the event of reduced tire pressure. In particular, the support ring has a simplified geometry consisting of a series of repeating arches.

BACKGROUND OF THE INVENTION

Tires are primarily supported by internal air pressure. A number of tire designs now exist that use a support ring located inside the tire to support the tire when the tire is operated in an underinflated condition. The use of a support ring of annular shape made of a flexible elastomeric material has been known for a long time.

One known design for the support ring consists of two circular bands of rubber connected together by a complex web of rubber to reduce weight and maintain strength as the weight of the vehicle descends on the support ring. One example is disclosed in U.S. Pat. No. 5,891,279. However, the complex web structure can create difficulties in mold design and molding of the support ring.

The web structure of the support ring of U.S. Pat. No. 5,891,279, and similar designs, has a column-like configuration. However, when the ring supports the vehicle load during underinflation, the incompressibility of the column creates an undesirable strikethrough, or heavy thump, as the tire rotates.

The present invention is directed to a tire support ring with a geometry that is easier in respect to mold design and molding, and works to eliminate strikethrough by a unique and flexible web structure.

SUMMARY OF THE INVENTION

The inventive support ring is intended to be mounted on a wheel rim inside a tire, in order to support the tread strip of the tire in the event of reduced inflation pressure. The support has a contoured base intended to fit snugly around the wheel rim contour, a substantially cylindrical cap. In accordance with the invention, a series of repeating arches extends between and connects the base and the cap.

The arches preferably extend continuously along the length of the support ring. The arches may also extend across the full width of the support ring.

The support ring may be formed from any suitable material which can support the under-inflated tire during operation and which will remain viable for at least a distance which will enable the vehicle operator to have the tire examined, and fixed or repaired. The material may be elastomeric, thermoplastic, or thermoset.

In another aspect of the invention, the arches form at least one cavity that spans the width of the support ring. A second cavity may also be formed radially outward and circumferentially displaced from the first cavity.

BRIEF DESCRIPTION OF THE DRAWINGS

The invention will be described by way of example and with reference to the accompanying drawings in which.

DETAILED DESCRIPTION OF THE INVENTION

Figure 1:
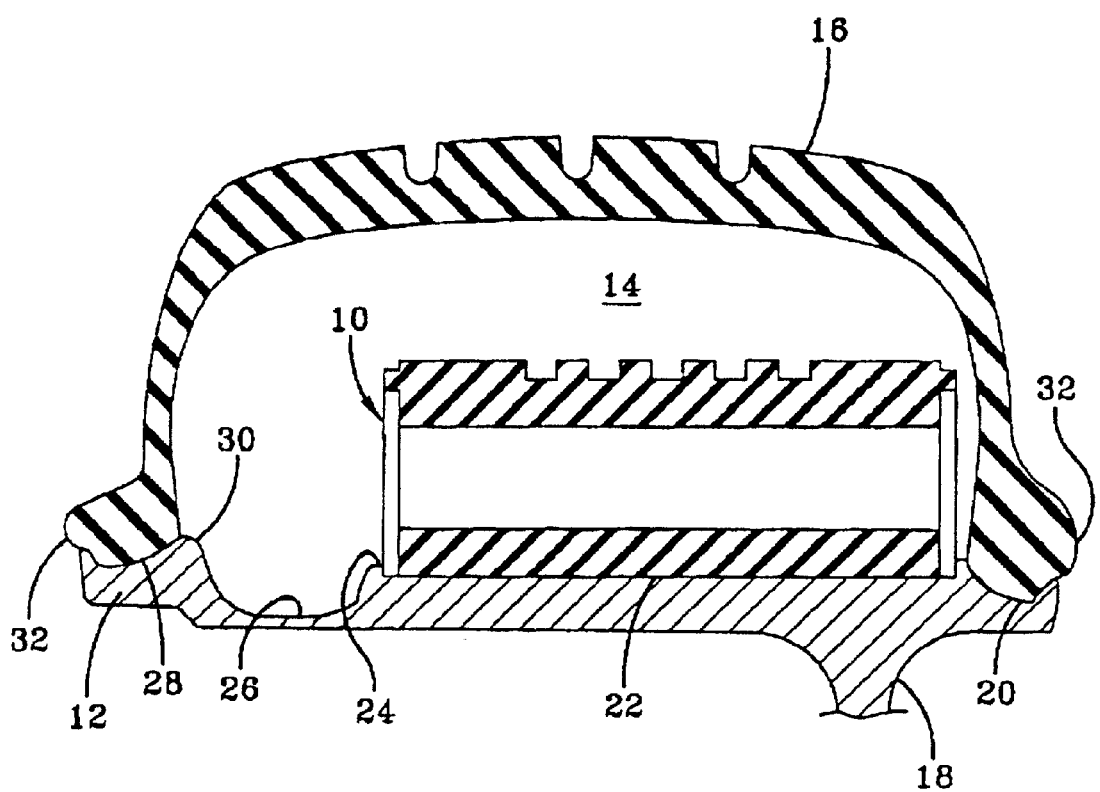
FIG. 1 is a cross-section view of a tire, rim, and support ring.

FIG. 1 illustrates a support ring 10 according to the invention mounted around a preferential wheel rim 12 and inside the cavity 14 of a corresponding tire 16.

The wheel rim 12 is a one-piece wheel. The wheel rim 12 comprises axially, starting from the same side as the wheel disk 18, namely from the side intended to be on the outboard side of the vehicle: a first seat 20, a flat cylindrical region 22 intended to receive the support ring 10, the diameter of this region 22 is greater than that of the seat 20 to allow the support ring to be mounted easily and directly by slipping it on axially, a stop 24 for the transverse immobilization of the support ring 10, a mounting well 26, this well 26 is of minimized size by comparison with conventional mounting wells, a second seat 28 preceded by a retaining hump 30, the diameter of this second seat is greater than the diameter of the region 22. One feature of this wheel rim is that the two seats 20, 28 are angled in the opposite direction to the seats of conventional wheel rims.

The illustrated tire 16 is an asymmetric tire and has two beads 32 of differing diameters.

Figure 2:
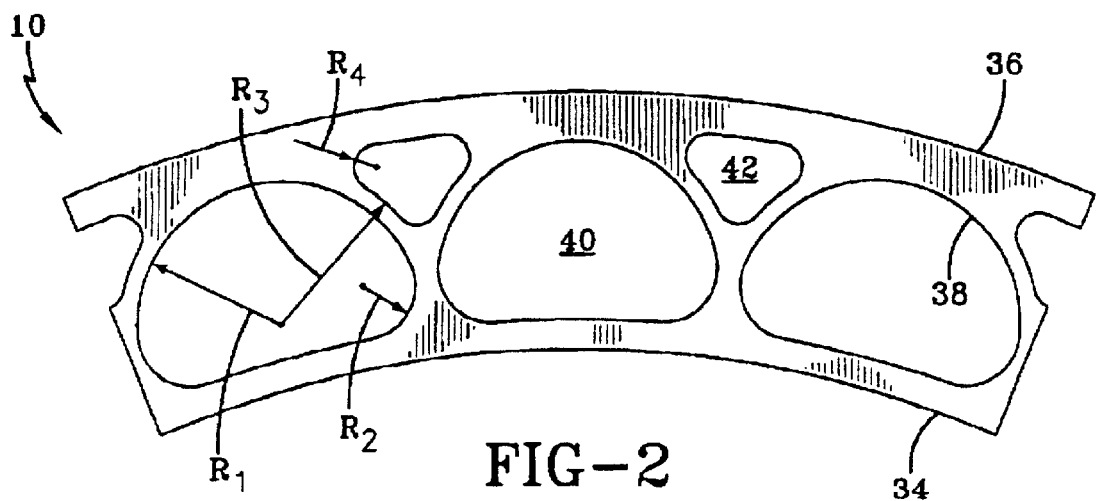
FIG. 2 is a side view of the tire support ring.

The support ring 10 has three main parts (see FIG. 2): an inner base 34, a substantially cylindrical cap 36, and a series of arches 38 located between the base 34 and the cap 36. The arches 38 repeat continuously between the two bands 34, 36, forming at least one cavity 40, and preferably forming a second cavity 42 radially above and circumferentially offset from the first cavity 40. The support ring 10 is a continuous unitary article. The height of the support ring 10 is chosen to be such that in all normal use of the tire it will not contact the underside of the tire even with appreciable temporary overload. This height corresponds to approximately half the height of the tire cavity 14 as measured between the wheel rim and the cap of the tire.

The support ring 10 may also be defined as having a first side 44 and a second side 46, each side 44, 46 extending circumferentially along the length of the support ring 10. The arches 38 extend from the inner side 44 to the outer side 46 of the support ring 10, and thus the cavities 40, 42 extend the full transverse width of the support ring 10.

Each arch 38 contacts the cap 36 at the maximum point of the arch 38. When the support ring 10 is subjected to weight, such as when the tire 16 is operated at an underinflated state and the underside of the tire 16 rests upon the support ring 10, the arch 38 flexs down, transferring the weight down the sides of the arch 38 and to the base 34 and the wheel rim 12.

The inner side of each arch 38 is defined by a first radius $R_1$ that defines the majority of the inner side of the arch. A second radius $R_2$ defines the portion of the arch 38 radially inward where each arch 38 connects with the adjacent arch 38. Each second radius portion connects with a relatively flat base of the first cavity 40. Each cavity 40 may also be geometrically described as an arc, with a radius $R_1$ joined by a chord wherein the connection points between the arc and the chord are rounded out.

The outer side of each arch, having a radius $R_3$, forms the two lower sides of the three sided second cavity 42. The second cavity 42 may be geometrically described as an inverted triangle with the junctures between the three legs being rounded out. To minimize the stress on the three junctures, the junctures are all preferably formed with the same radius of curvature $R_4$.

The radius $R_1$ of each arch is identical to allow for equal load sharing. The radii of the arches is based upon the thickness of the support material, which in turn can be based upon the material forming the support ring, the height of the support ring depending upon the tire design, the desired support ring characteristics, or other factors affecting the ring and tire performance.

By way of examples only, for a support ring in accordance with the invention with an inner radius of 23.25 cm and an outer radius of 28.75 cm, the following are exemplary arch dimensions. Example 1: the arch has a lower radius of 2.54 cm and an upper radius of 3.56 cm, thus having a thickness of approximately 10 mm. Example 2: the arch has a lower radius of 3.0 cm and an upper radius of 3.4 cm, forming a thickness of 4 mm. The thickness of the arch also determines the size of the upper cavity.

The number and size of the arches 38 is dependent upon a number of factors, including the material selection, the circumferential length of the support, and the anticipated load characteristics, and desired operating conditions. Because of these factors, some of which may be excluded when designing the rings, and the flexibility of the design, for a single ring size, a variety of rings with different arch dimensions can be designed.

The support ring 10 is formed from elastomeric, thermoplastic, or thermoset materials. If the support ring 10 is formed of elastomeric material, such as natural rubber, the elastomer should have a Shore A hardness of 60 to 90. If the support ring 10 is formed of a material such as polyurethane, polyester elastomers, or nylon, than the material should have a Shore D hardness of 30 to 45.

As noted above, material selection can affect the arch design. In the examples provided above, the first example support ring, having a greater web thickness, is preferably formed of an elastomeric material, while the second example, with a thinner web thickness, is preferably formed of a resin material.

In order to improve the endurance performance of the support, a lubricant is included inside the tire cavity 14 in order to lubricate any contact there may be between the top of the support ring 10 and the inside of the tire 16.

Figure 3:
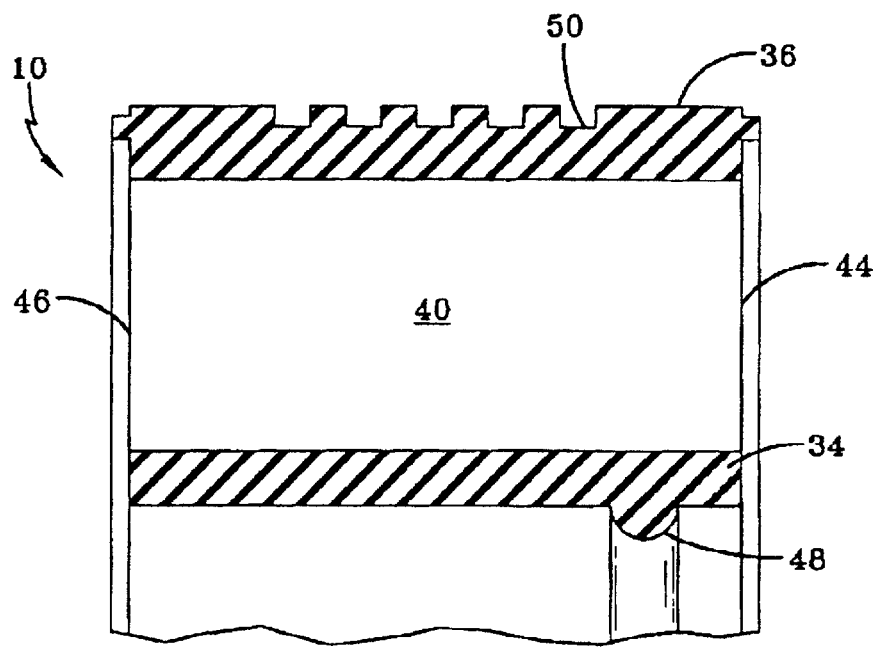
FIG. 3 is a side view of an another embodiment of the tire support ring.

The support ring 10 may be provided with different options, as illustrated in FIG. 3. The support ring 10 may be provided with either a continuous or non-continuous hump 48 on the underside of the base 34. The hump 48 would assist in mounting the support ring 10 onto a wheel rim 12 that has a corresponding groove.

The support ring 10 may also be provided with continuous or non-continuous grooves 50 on the cap 36 spaced across the width of the cap 36. The grooves 50 are illustrated as equally spaced across the width of the cap 36, but may be irregularly spaced. The grooves 50 provide for uniform distribution of the lubricant and heat dispersion during reduced pressure operation. The grooves 50 also help to reduce the weight of the ring 10, without effecting performance of the ring 10, when the ring 10 is formed of a heavier material.

Additionally, while not illustrated, the base 34 may be reinforced with inextensible reinforcing members. The reinforcing means can be individual wire filaments, individual cables, or wrapped steel cables. The selection of a reinforcing material will be dependent upon the material selection for the support ring 10 and upon the desired strengthening of the support ring 10. The inextensible reinforcing members assist in preventing growth of the ring 10 during rotation. Such an option is dependent upon the material selection for the ring 10 and is preferably used only when the ring 10 is formed of elastomeric materials.

Also, if desired for additional strengthening of support ring 10, the second upper cavity 42 may be absent, providing additional material underneath the cap 36.

To vary the ride characteristics of the ring 10, the first or second cavity 40, 42 may be filled with a foam rubber.

While the arches 38, and the corresponding formed primary and secondary cavity 40, 42 are illustrated as extending straight across the transverse width of the ring 10, the cavities 40, 42 may be in a variety of configurations as the cavities 40, 42 extend across the width of the ring 10. The cavities 40, 42 may extend obliquely across the ring width, may be curved across the ring width, or may be v-shaped across the width. By varying the orientation of the cavities 40, 42, and thus the orientation of the arches 38, under load the cavities 40, 42 will progressively collapse and at no time will the load be completely on one single arch 38, but will be further distributed over adjacent arches 38.

While illustrated and describe as being used with an asymmetric wheel rim 12 and asymmetric tire 16, the support ring 10 may also, of course, be mounted on a conventional two-part wheel rim with a flat base and mounted within either a conventional tire or a symmetrical runflat tire. The ring 10 may also be modified and formed as a split ring with a securing mechanism for mounting on a one-piece wheel.

With the inventive construction, compared to known support rings, the molding of the support ring 10 is simplified and easier to manufacture.

As discussed, by providing the reinforcing structure of the ring 10 with arches, as opposed to known columns, the arches flex and compress with load, transferring forces to the wheel rim. The flexing of the arches reduces strikethrough effects of the support ring. Also, the design of the arch provides for great flexibility in the exact design of the support ring.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire assembly comprising a wheel having a wheel rim, a tire mounted on the wheel, and a support ring mounted on the wheel rim inside the tire, the support ring being capable of supporting a tread strip of the tire in the event of a loss of inflation pressure, the support ring comprising a base intended to fit around the wheel rim, a cap, and a series of repeating arches having an inner side and an outer side extending between and connecting the base and the cap, the arches extending in the circumferential direction of the ring and forming two sets of cavities, at least one cavity set being open to both sides of the support ring, one set of cavities having a configuration comprising an arc formed by the inner side of one arch, the ends of the arc being joined by a chord, the second cavity being partially formed by the outer side of a pair of adjacent arches.

2. A tire assembly in accordance with claim 1, wherein the support ring repeating arches extend continuously along the length of the support ring.

3. A tire assembly in accordance with claim 1, wherein the support ring is formed of a flexible elastomeric material having a Shore A hardness of not more than 90.

4. A tire assembly in accordance with claim 1, wherein the support ring is formed of a thermoplastic or thermoset material.

5. A tire assembly in accordance with claim 1, wherein the support ring is formed of a material have a Shore D hardness of not more than 45.

6. A tire assembly in accordance with claim 1, wherein the support ring is formed of a material selected from the group of polyurethane, polyester, or nylon.

7. A tire assembly in accordance with claim 1, wherein at least one of the cavities of the support ring is filled with a foam material.

8. A tire assembly in accordance with claim 1, wherein the support ring is formed as a split ring and is further comprised of a securing mechanism to close the ring about a wheel.

9. A tire assembly in accordance with claim 1, wherein the support ring cavities extend across the ring at an oblique angle relative to the circumferential direction of the ring.

10. A tire assembly in accordance with claim 1, wherein the ring is reinforced with a material selected from the group consisting essentially of individual wire filaments, individual cables, and wrapped steel cables.

* * * * *